United States Patent [19]

Carse et al.

[11] Patent Number: 4,730,311
[45] Date of Patent: Mar. 8, 1988

[54] REMOTE MULTIPLEXER FOR DIGITAL TELEPHONE SYSTEM

[75] Inventors: Gregg D. Carse, Mountain View; Bernard N. Daines, Union City, both of Calif.

[73] Assignee: Pacific Bell, San Francisco, Calif.

[21] Appl. No.: 791,304

[22] Filed: Oct. 25, 1985

Related U.S. Application Data

[63] Continuation-in-part of Ser. No. 711,083, Mar. 12, 1985, abandoned.

[51] Int. Cl.[4] .............................................. H04J 3/12
[52] U.S. Cl. ................................................ 370/110.1
[58] Field of Search ................... 370/110.1, 58, 68.1; 179/2 DP; 379/359, 237

[56] References Cited

U.S. PATENT DOCUMENTS

| | | | |
|---|---|---|---|
| 4,317,962 | 3/1982 | Cox et al. ........................ | 370/110.1 |
| 4,330,886 | 5/1982 | Fukuda et al. ................... | 370/62 |
| 4,332,980 | 6/1982 | Reynolds et al. ................ | 340/825.5 |
| 4,367,548 | 1/1983 | Cotton, Jr. et al. .............. | 370/3 |
| 4,381,427 | 4/1983 | Cheal et al. ..................... | 370/110.1 |
| 4,390,986 | 6/1983 | Moses .............................. | 370/99 |
| 4,397,030 | 8/1983 | Becker et al. .................... | 370/100 |
| 4,449,218 | 5/1984 | Strehl ............................... | 370/69.1 |
| 4,450,556 | 5/1984 | Boleda et al. .................... | 370/58 |
| 4,463,351 | 7/1984 | Chiarottino ...................... | 370/85 |
| 4,465,904 | 8/1984 | Gottsegen et al. ............... | 340/825.51 |
| 4,467,473 | 8/1984 | Arnon et al. ..................... | 370/100 |
| 4,476,558 | 10/1984 | Arnon ............................... | 370/100 |
| 4,476,559 | 10/1984 | Brolin et al. ..................... | 370/110.1 |
| 4,578,789 | 3/1986 | Middleton et al. ............... | 370/110.1 |
| 4,607,364 | 8/1986 | Neumann et al. ................ | 370/110.1 |
| 4,612,634 | 9/1986 | Bellamy et al. .................. | 370/110.1 |
| 4,627,047 | 12/1986 | Pitroda et al. .................... | 370/110.1 |

OTHER PUBLICATIONS

Soejima, T., Tsuda, T., and Ogiwars, H.; "Experimental Bidirectional Subscriber Loop Transmission System", *IEEE Transactions on Communications*, vol. 30, pp. 2066–2073, Sep. 1982.

Suzuki, T., Takatori, H., Ogawa, M., and Tomooka, K., "Line Equalizer for a Digital Subscriber Loop Employing Switched Capacitor Technology", *IEEE Transactions on Communications*, vol. 30, pp. 2074–2082, Sep. 1982.

Inoue, N., Komiya, R., and Inoue, Y., "Time-Shared Two-Wire Digital Transmission for Subscriber Loops", 1979 IEEE, pp. 2.4.1–2.4.5.

Gregory, D., "A Loop Concentrator Multiplexer System in a Digital Switching Environment", International Symposium-Subscriber Loops and Services Conference Proceedings, Ottawa, Ontario, May 20–23, 1974, Paper 7.3.

(List continued on next page.)

*Primary Examiner*—Douglas W. Olms
*Assistant Examiner*—Frank M. Scutch, III
*Attorney, Agent, or Firm*—Fitch, Even, Tabin & Flannery

[57] ABSTRACT

A multiplexer for use in a telephone system in which a plurality of subscriber locations are connected to a central office by a single subscribe loop is described. The multiplexer unit of the invention includes a voice interfacing circuit for converting between voice encoded digital signals and analog signals for operatively connecting to at least one subscriber voice communication apparatus. Data interfacing circuits are provided for routing data encoded digital signals to at least one subscriber digital communication apparatus. A frame processor is connected to each of the voice interfacing circuits and the data interfacing circuits for assembling and disassembling frames of voice encoded digital signals and data encoded digital signals. A transceiver is connected to the frame processor for transmitting to and receiving from a central office frames of voice encoded and data encoded digital signals. A utility processor is connected to the voice interfacing circuits, the digital interfacing circuits, the frame processor, and the transceiver for controlling those elements in accordance with control and status data encoded digital signals received by the transceiver from the central office, and for producing control and status data encoded digital signals for transmission by the transceiver to the central office.

7 Claims, 2 Drawing Figures

OTHER PUBLICATIONS

Suzuki, T., Takatori, H., Shirasu, H., Ogawa, M., and Kunimi, N., "A CMOS Switched-Capacitor Variable Line Equalizer", 1983 *IEEE*, vol. SC-18, pp. 700-706, Dec. 1983.

Claire, E. J., "Vidon a New Multiple Service System for the Existing Telephone Local Loop", Proc. Natl. Electron Conf., V. 33, Chicago, Ill., Oct. 29-31, 1979, Natl. Eng. Consortium, 1979, pp. 488-494.

Mano, S., Komiya, R., and Sasakawa, M., "System Design for Digital Subscriber Loops", *Review of the Electrical Communication Laboratories*, vol. 32, pp. 351-364, 1984.

Adams, P. F., Geln, P. J., and Woolhouse, S. P., "Echo Cancellation Applied to WAL 2 Digital Transmission in the Local Network", IEEE Conference Publication, No. 193, Int. Conf. on Telecommunications Transmission—Into the Digital Era, 2nd. London, Eng., Mar. 17-20, 1981.

Van de Meeber, L. and Janssen, D. J. G., "PCM Codec with On-Chip Digital Filters", Conf. Record-Intl. Conf. Communications, ICC 1980 IEEE, (Catalog No. 80 CH 1506-5) pp. 30.4.1-30.4.6.

Yamagata, J., Kozuka, S., and Hayashi, I., "New Digital Data Transmission System", Japan Telecommunications Review, pp. 327-333, Oct. 1981.

Shimizu, H. and Goto, H., "An Integrated Voice/Data Terminal with Simple Synchronization Circuits Using an 80 kbit/s Ping-Pong Method", IEEE Transactions on Communications, vol. COM-30, pp. 2109-2116, Sep. 1982.

Montaudoin, P., de Passoz, G., Pernin, J. L., and Perrot, J., "The 64 kbit/s Switched Digital Service Using the Public Telephone Network", Commutation Transm., vol. 5, No. 3, Sep. 1983, pp. 127-138.

Bowsher, B. D. and Eng, C., "New Digital Transmission Services for the Business Community", *Communications & Broadcasting*, vol. 7, No. 2, pp. 1-10.

Rosenbaum, S., "Voice Coding and Filtering, One Chip Does It", Telesis, vol. 4, pp. 19-23, 1980.

Maki, K., Ogiwara, H., and Yamano, S., "Digital Subscriber Circuit Terminating Equipment Design", Review of the Electrical Communication Laboratories, vol. 32, No. 2, pp. 365-376, 1984.

The Institution of Electrical Engineers Electronics Division Colloqium on "Recent Developments in System X", Apr. 19, 1982, Digest No. 1982/39.

Waber, K. W., "Considerations on Customer Access to the ISDN", IEEE Transactions on Communications, vol. COM-30, pp. 2131-2136, Sep. 1982.

Ebert, I. G., "The Evolution of Integrated Access Towards the ISDN", IEEE Communications Magazine, vol. 22, pp. 6-11, Apr. 1984.

Divnogortsev, G. P., "High-Frequency Data Transmission Over Urban Telephone Networks", Telecommun. Radio Eng., vol. 26-27, No. 6, Jun. 1972, pp. 40-42.

Arvidson, W. P. and Morgen, D. H., "Performance of Digital Subscriber Loop Carrier Systems", Intl. Symposium on Subscriber Loops and Services, Cong. Rec., Georgia Inst. of Tech., Atlanta, Ga., Mar. 20-24, 1978.

Pedersen, T. J., "An Integrated Digital Subscriber Multiplexing and Switching System for Mixed Circuit and Packet Communication", Intl. Symposium on Subscriber Loops and Services, Conf. Rec., Georgia Inst. of Tech., Atlanta, Ga., Mar. 20-24, 1978.

Furhmann, J. J., "A Digital Telephone Local Distribution System", Intl. Symposium—Subscriber Loops and Services, Conf. Rec., Ottawa, Ontario, May 20-23, 1974.

Kozuka, S., Hayashi, I., and Tokizawa, I., "New Digital Data Transmission System Overview", *Review of the Electrical Communication Laboratories*, vol. 31, No. 2, pp. 135-145, 1983.

Mackey, E. T., Mayback, W. J., and Pfeiffer, S. B., "Mixing Data and Voice on the I1 Line", *Bell Laboratories Record*, pp. 136-142, Feb. 1975.

Fossati, R., Galio, S., Lazzari, V., and Ravaglia, R., "A Remote Powered Digital Telephone Set: Problems, Performance and Prospects", Intl. Symposium on Subscriber Loops and Services, Munich, Germany, Sep. 15-19, 1980, vol. 73, pp. 60-63, 1980.

Mills, H. J., "Impact of Microprocessor and LSI Technology on the Design of the Digital Exchange System", Colloq. Int. de Commutation, Paris, France, May 7-11, 1979, Comite due Collog. Int. de Commutation, Paris, France, 1979, vol. 2, pp. 729-736.

Katzschner, L. and Wizgali, M., "Problems of Signalling in Integrated PCM-Switching Networks for Data and Telephone", Institute of Switching and Data Technics, University of Stuttgart, pp. 413.4.1-413.4.8, 1976.

Svensson, T., "Methods for Two-Wire Duplex Digital Transmission at 80 kbit/s on Subscriber Lines", Intl. Zurich Seminar on Digital Communications, 5th: Digital Transmission and Switch in Local Networks, Proc., Swiss Fed. Inst. of Tech., Zurich, Switzerland, Mar. 7-9, 1978.

REMOTE MULTIPLEXER FOR DIGITAL TELEPHONE SYSTEM

This application is a continuation-in-part of U.S. application Ser. No. 711,083, filed Mar. 12, 1985, now abandoned.

The present invention relates generally to a telephone system wherein a plurality of subscriber locations are each connected to a central office by a single subscriber loop over which fully digitized integrated voice and data are transmitted and received. More particularly, the invention concerns a multiplexer for installation at or near the subscriber location remote from the central office for use in such a telephone system.

BACKGROUND OF THE INVENTION

Telephone systems in the United States and in many other countries were originally designed solely for the transmission of analog voice signals between subscriber locations and a central office. At the central office, signals from and to the various subscriber locations are handled by suitable switching systems. Connection between the central office and each subscriber location is typically by means of a single subscriber loop—usually a twisted pair of insulated copper wires.

With the coming of the "information age," telephone companies have sought ways to increase the level of service to their subscribers. One way of doing this is to increase the capacity of subscriber-to-central office communication by adding subscriber loops. As one might imagine, however, the cost of installing additional subscriber loops in an existing telephone system for all subscribers is prohibitive.

Many telephone companies have, accordingly, explored the use of digital signaling techniques along with multiplexing and time compression in order to cram more information into signals traveling between subscribers and the central office. Since digital transmission techniques via microwave and other long distance signaling systems are already employed, and in as much as digital switching is utilized in many modernized central offices, the digitizing of the subscriber loop affords evident advantages. Nevertheless, although the prior art is replete with various approaches to the subscriber loop digitization problem, the difficulties thus far encountered have prevented practical commercial fulfillment of this objective.

By way of example, a bidirectional subscriber loop transmission system is described by Soejima, et al., "Experimental Bidirectional Subscriber Loop Transmission System," IEE Transactions on Communications, Vol. Com-30, No. 9, September 1982. This system is based on a time compression burst mode transmission scheme (ping-pong), and provides two information channels and a signaling channel. In this, and other similar systems, however, serious problems are encountered in achieving sufficient transmission quality over the distances usually encountered in connection with subscriber service. Such problems include cross talk, echoing as a result of discontinuities and taps in the line, and the natural attenuation of high frequency signals with transmission distance.

Other difficulties arise in connection with the combining of voice information with data. The data may take the form of relatively high speed data such as that utilized by a computer terminal, or relatively low spped data such as alarms or medical or police alert functions.

By way of example, U.S. Pat. No. 4,476,558, to Arnon describes a digital transmission signal system employing time compression multiplexing in which burst mode or ping-pong transmission is utilized. However, only voice information is transmitted and there is no successful combination of voice and data in this system. In another example, U.S. Pat. No. 4,332,980, transmission of both voice and data is described. However, in this system, a "voice over data" technique is utilized wherein the voice information remains in analog form and wherein the data transmission is transmitted at a different and supposedly noninterfering frequency.

Nowhere in the prior art is there a teaching of a transmission method and system capable of handling both voice and data in digitized format which can be successfully applied to typical existing telephone subscriber systems. Either the capacity for handling the voice and data information is inadequate, or the transmission quality and distance is insufficient for commercial application, or both. The problems created by typical irregularities in subscriber loops resulting from discontinuities, taps, oxidation, etc. create unacceptable echo signals. Cross talk between the various data channels is in many cases unacceptable. Transmission distance to adequately serve typical subscriber locations is frequently not achieved. Quality of voice information is often unacceptable.

SUMMARY OF THE INVENTION

In U.S. patent application Ser. No. 711,083, filed Mar. 12, 1985, an improved telephone system is described wherein a plurality of subscriber locations are each connected to a central office by a single subscriber loop. At least one voice channel, at least one data channel, and at least one signaling channel are provided for the subscriber. High quality signals are achieved at transmission distances up to and exceeding six kilometers.

In order to acquire information, voice and/or data, from various pieces of equipment located at the subscriber premise, and to provide such information flowing in the other direction to such equipment, the system described in the above patent application employs a remote multiplexer, also called a subscriber unit. The remote multiplexer must collect analog voice (voice-frequency) signals, digital data, and signaling information from the subscriber's equipment and transmits a single digital bit stream to the central office over the subscriber loop. Communication between the remote multiplexer and the central office is bidirectional. Thus, the remote multiplexer also demultiplexes a single digital bit stream passing from the central office over the subscriber loop, converting digital voice to voice frequency signals, and outputs appropriate voice and data signals to the subscriber's equipment.

The present invention relates specifically to the remote multiplexer unit itself. Very generally, the multiplexer unit of the invention includes a voice interfacing circuit for converting between voice encoded digital signals and analog signals for operatively connecting to at least one subscriber voice communication equipment. Data interfacing circuits are provided for routing data encoded digital signals to at least one subscriber digital communication equipment. A frame processor is connected to each of the voice interfacing circuits and the data interfacing circuits for assembling and disassembling frames of voice encoded digital signals and data encoded digital signals. A transceiver is connected to the frame processor for transmitting to and receiving from a central office frames of voice encoded and data encoded digital signals. A utility processor is connected to the voice interfacing circuits, the digital interfacing circuits and the frame processor, and the transceiver for controlling those elements in accordance with control and status data encoded digital signals received by the transceiver from the central office, and for producing control and status data encoded digital signals for transmission by the transceiver to the central office.

An object of the invention is to provide a remote multiplexer unit for use in a telephone system wherein fully digitized integrated voice and data are transmitted and received on a subscriber loop.

Another object of the invention is to provide an improved device for installation at or near a subscriber location for interfacing subscriber equipment with a telephone system wherein fully digitized integrated voice and data are transmitted and received on a subscriber loop.

A further object of the invention is to provide a remote multiplexer unit capable of assembling and disassembling digitized voice and data information in cooperation with a telephone system as described in U.S. patent application Ser. No. 711,083.

Other objects, advantages and features of the present invention will become apparent to those skilled in the art from the following description, taken in connection with the accompanying drawings and appended claims.

DESCRIPTION OF THE PREFERRED EMBODIMENT

Figure 1:
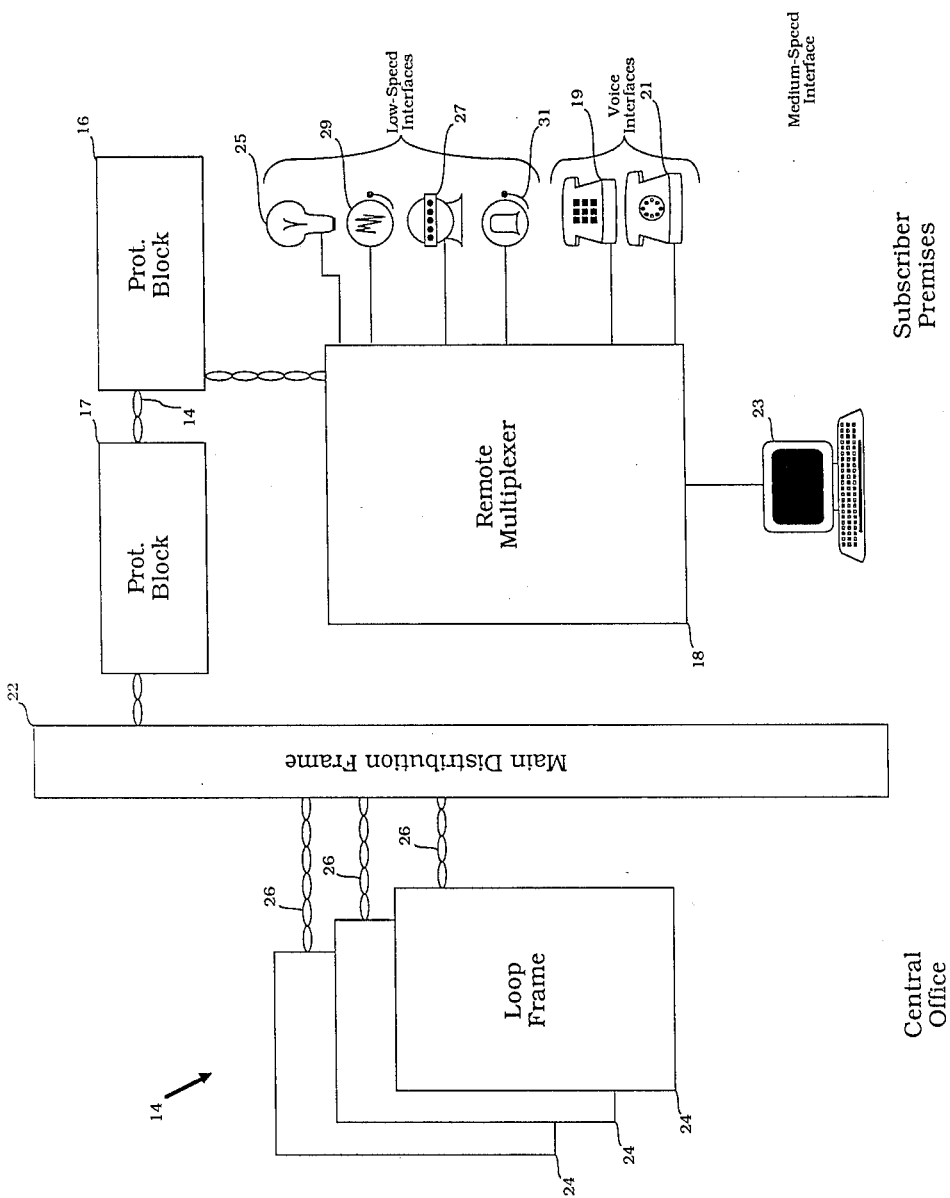
FIG. 1 is a simplified schematic diagram of a telephone system showing the location of a single remote multiplexer of the present invention in relation to the system; and, FIG. 2 is a schematic block diagram of the subscriber unit illustrated in FIG. 1.

Referring now to FIG. 1, there is shown a telephone system employing a subscriber unit constructed in accordance with the present invention. The telephone system connects a plurality of subscriber premises, one of which is shown as the subscriber premise 12, to a central office 14. Each subscriber location 12 is electrically connected to the central office 14 by its own subscriber loop 16, also known as a twisted pair. Distributed along each subscriber loop 16 are one or more protection blocks 17 of suitable design as is known in the art. In a preferred embodiment of the present invention, one protection block 17 is located at the central office end of the subscriber loop 16 and another protection block 17 is located at the subscriber location end of the subscriber loop 16. The protection blocks 17 electrically protect the central office circuitry and subscriber equipment from voltage spikes and surges occurring along the subscriber loop 16. Such voltage spikes and surges are typically caused by lighting and other electrical interferences.

Located at each subscriber premise 12, wherein services contemplated by the present invention are desired, is a remote multiplexer or subscriber unit 18 which provides the interface for connection of subscriber equipment to the telephone system 10. The subscriber equipment may include, for example, two telephones, 19 and 21 (sources of voice data), a personal computer 23 (source of medium speed data), and management, monitoring, and alarm systems such as energy manager 25, meter monitor 27, fire alarm 29, and burgler alarm 31 (sources of low speed data).

In a preferred embodiment of the present invention, the subscriber unit 18 supports the following input-output (I/O) connections for subscriber equipment:

(1) two standard 500 series compatible phone connections or voiceband data modem connections;

(2) one high speed asynchronous modemless data connection; and (3) four low speed synchronous data connections for telemetry applications.

Since the preferred embodiment of the present invention is intended to utilize as much pre-existing telephone equipment as possible, the subscriber unit 18 preferably uses standard cable and connectors for subscriber owned equipment. Thus, in the preferred form for the Northern California service area, the 500 series compatible phone connections are standard RJ-11 connectors, and the medium speed asynchronous modemless data connection and the four low speed synchronous modemless data connections are through an eight pin RJ-41 connector. Of course, it would be within the level of ordinary skill to provide a subscriber unit which would support other combinations of subscriber owned equipment and connectors.

Generally, the remote multiplexer 18 digitally encodes, multiplexes and transmits the voice signals and data signals applied to the above described connections to the central office 14 over the subscriber loop 16. Conversely, the remote multiplexer 18 demultiplexes and decodes the digital information received from the central office 14 over the subscriber loop 16 and delivers the decoded voice signals and decoded data signals to the appropriate subscriber equipment.

The central office 14 includes a telephone company switching system (not shown), which may be either an analog or digital switching system of suitable design, and a main conventional distribution frame 22. Each subscriber loop 16 is terminated at the central office 14 by the main distribution frame 22. For those subscriber locations having ordinary telephone service, i.e. which do not have a remote multiplexer 18, the main distribution frame 22 connects the subscriber loop for ordinary telephone service directly to the telephone company switching system (not shown) through a twisted pair of wires (not shown). However, those subscriber locations, such as the subscriber location 12, which have a remote multiplexer 18, the main distribution frame 22 connects the subscriber loop 16 to a loop frame 24 by a twisted pair 26 associated with each subscriber loop 16. Thus, for each subscriber loop 16, there is one twisted pair 26 connecting such subscriber loop 16 to the loop frame 24.

Generally, the loop frame 24 demultiplexes the digital information transmitted by each remote multiplexer 18 along its associated subscriber loop 16. Since each remote multiplexer 18 encodes two voice band channels, for each twisted pair 26 connected to the loop frame 24, two voice connections (not shown) are made from the loop frame 24 to the main distribution frame 22, and each carries one voice channel. For each voice channel coupled between the loop frame 24 and the main distribution frame 22, there is an associated connection coupled between the main distribution frame 22 and the telephone company switching system (not shown). The central office 14 may include any number of loop frames, which number depends upon the number of subscriber loops connected to the central office and the number of such loops supported by each loop frame. For example, a typical central office may include twelve loop frames, wherein each loop frame supports four hundred eighty subscriber loops. The telephone company switching system switches the voice channels to the respective intended recipients.

The remote multiplexer 18 includes means for encoding low speed data signals from sources of low speed data signals such as the low speed services 25, 27, 29 and 31. The remote multiplexer 18 also includes means for encoding the voice signals from the sources of voice signals indicated by the telephones 19 and 21, and means for encoding medium speed data signals from a source of medium speed data signals such as the computer 23.

According to the present invention, no assumptions are made about the format of the encoding of the data applied to the low speed data channels. Inputs to these channels are wired as dedicated paths to various vendor services such as intruder detection and control, as indicated by the alarm 31; power monitoring, as indicated by the electric meter 27; automatic notification of emergency services, as indicated by the fire alarm 29; and an energy management system as indicated by the light bulb 25.

The encoding performed by the remote multiplexer 18 develops a plurality of successive frames. Each of the frames has first voice bits encoding the voice signals from the telephone 19 and second voice bits encoding voice signals from the telephone 21. Each frame also includes at least one data bit encoding the data signal for each of the associated one of the low speed services 25, 27, 29 and 31, and a plurality of medium speed data bits encoding the data signals from the computer 23. The remote multiplexer 18 further includes means for transmitting the successive frames from each remote multiplexer 18 on the subscriber loop 16 associated therewith. Each subscriber loop 16 is terminated by the main distribution frame which routes the digital signals on each subscriber loop 16 to the loop frame 24. The loop frame 24 is responsive to the successive frames from each subscriber loop 16 for decoding the successive frames on each subscriber loop 16 into first voice information signals from the first voice bits and second voice information signals from the second voice bits. The loop frame 24 is further responsive to the successive frames on all subscriber loops 16 for multiplexing the medium speed data bits in all frames into a medium speed data stream and multiplexing the low speed data bits in all frames into a low speed data stream.

Figure 2:
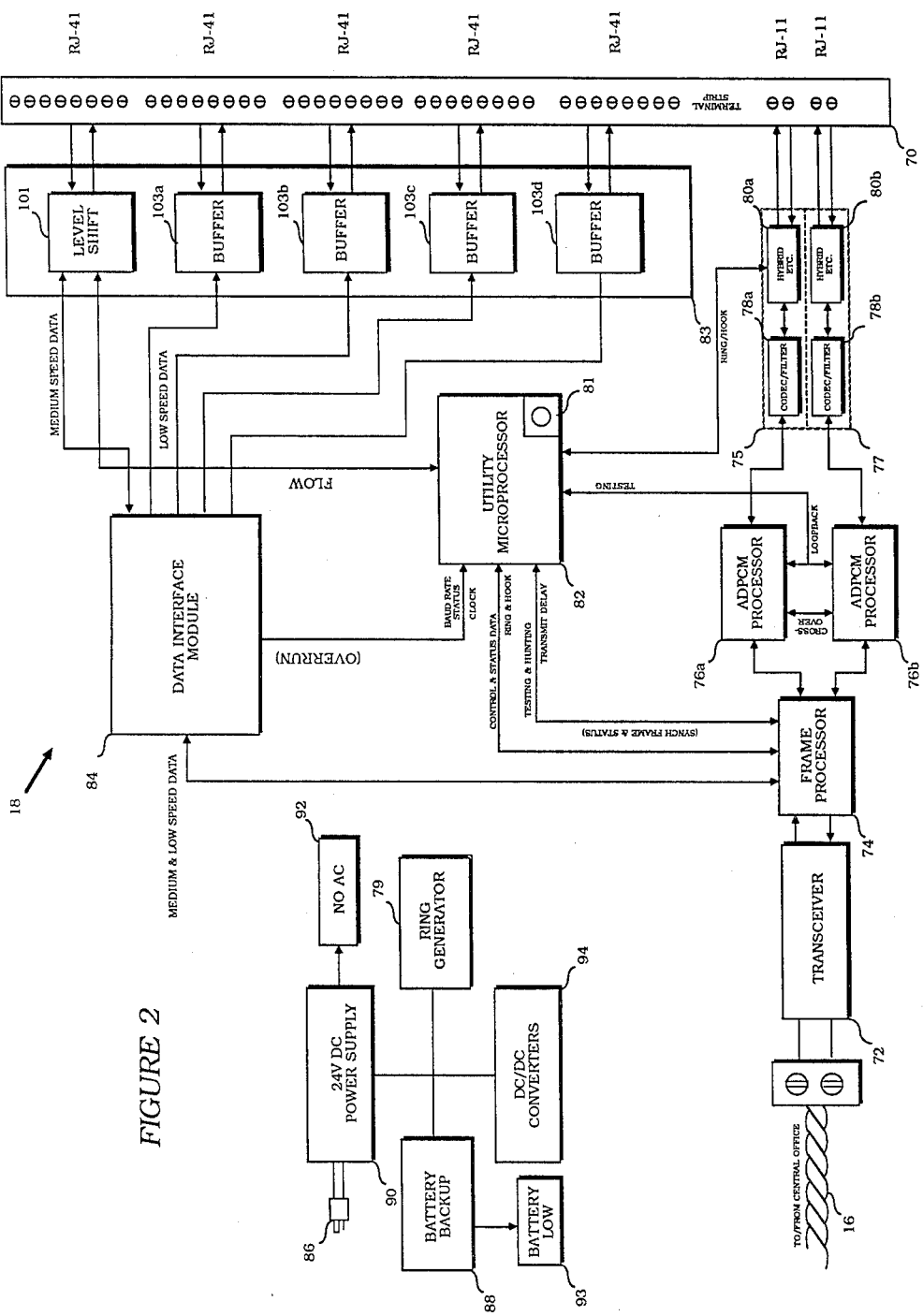

Referring now to FIG. 2, there is shown a schematic block diagram of the remote multiplexer 18. A terminal strip 70 hard wires the external modular connectors described above to the internal circuitry of the remote multiplexer 18. The remote multiplexer 18 includes a transceiver 72 which transmits and receives the digital information over the subscriber loop 16, a ping-pong unit 74 which multiplexes the various voice and data channels to form the frames transmitted over subscriber loop 16, an adaptive delta pulse code modulation (ADPCM) processor 76 in each voice channel, each of which converts between PCM coded voice information and ADPCM coded voice information, a codec/filter 78 and a hybrid 80 associated with each voice channel for encoding the voice signals from each source of voice signals 19 and 21 to standard PCM format providing the voice interface and, a utility microprocessor 82 which implements the signal and control status channel protocol and multiplexes the low speed data channels from sources 25, 27, 29 and 31, and a data set interface (DSI) circuit 84 which encodes the asynchronous high speed data signals from the source 23 to synchronous format.

The flow of data through the remote multiplexer is bidirectional. To simplify the description only one direction will be explained—from the central office to subscriber premise equipment. Unless otherwise stated, voice, data, and signal flow from subscriber premise equipment to the central office is simply the reverse of that explained.

The transceiver 72 is the interface to the subscriber loop, and is responsible for transmitting data to and receiving data from the central office. Multiplexed voice, data, control, and signaling information from the central office is transmitted over the subscriber loop and received by the transceiver. In the opposite direction, a multiplexed stream of voice, data, control and signaling information is passed from the remote multiplexer by the transceiver to the central office over the subscriber loop. Preferably, the effective bandwidth of the transmission is 80 kilobits per second. The channel is divided into two 32 kilobit per second digital voice channels, one 8 kilobit per second medium speed data channel, four 1 kilobit per second low speed data channels, one 2 kilobit per second control channel, and one 2 kilobit per second signaling channel. Each of the voice and data channels is independent, and all may be used simultaneously. From the perspective of the subscriber, it is as if the premises are wired with seven distinct telephone lines. The control and signaling channels carry system control and voice signaling, and data signaling information (respectively) between the remote multiplexer and the central office. Preferably, the transceiver is a LT/CT, manufactured by Fujitsu.

The frame processor or ping-pong unit 74 interfaces the transceiver to the two voice modules, the data interface module, and the utility processor. It demultiplexes the signals received from the transceiver and routes them to the appropriate remote multiplexer component (e.g., digital voice to the voice modules 75 and 77; data to the data interface module 84). In the preferred embodiment, the frame processor assembles voice data, low speed data, and medium speed data into bit frames which are 80 bits long. Similarly, the frame processor disassembles such frames as they are received by the transceiver, routing them along the medium speed, low speed, and voice data paths. The 80 bit frames are transmitted in alternating directions as in the ping pong transmission mode known in the art. The timing of the signal leaving transceiver 72 is adjusted by a suitable clock 81 in the utility processor 82 so that each frame or burst of data leaving the transceiver is received at the central office substantially simultaneously with the frames arriving from other remote multiplexers in the telephone system. This substantially reduces crosstalk problems.

The data interface module 84 interfaces with the frame processor 74, the utility processor 82 and the medium and low-speed data interface ports indicated generally at 83. It receives data channel information (medium and low-speed data, data channel signaling information) from the frame processor 74 and routes the data and signaling information to the appropriate data interface ports. It also reads data and status information from the ports, and at the proper time, delivers this information to the frame processor.

The utility processor 82 manages voice signals, configures and controls the remote multiplexer components, and communicates with the central office through the control channel (multiplexed on the subscriber loop). The microprocessor may be of any type suited to run software appropriate to the control and supervisory functions described. A preferred microprocessor is a 6301 manufactured by Motorola or Hitachi.

There are two voice modules 75 and 77 per remote multiplexer; each supports one 500-series (or compatible) telephone circuit. The voice modules convert digitally encoded voice signals from the central office to voice-frequency (analog) signals. The voice module then routes the voice-frequency signals to the appropriate voice interface port as described more fully below.

The ring generator 79 is controlled by the utility processor, and supplies the 90 V rms (with a −24 V offset), as known in the art, required to ring a subscriber's telephone. Unless the remote multiplexer is on battery power as described below, ringing will match the cadence supplied by the central office voice switch.

In a preferred embodiment of the present invention, the central office 14 does not supply electrical power to the remote multiplexer 18 over the subscriber loop 16. Instead, power is supplied to the remote multiplexer 18 from a source of local AC power 86 located at the subscriber location 12. In case of power failure, a battery backup 88 provides DC power to the remote multiplexer 18. In the event of failure of local AC power, an AC power failure alarm 92 switches the power supply 90 to the battery backup 88. When power is being supplied by battery backup 88, there is no noticeable change in the performance of the remote multiplexer 18 except that the ringing sequence developed by the ring generator 79 is changed to conserve power from the battery backup 88. When local AC power fails, the remote multiplexer 18 alerts the central office 14 by an alarm signal developed by the alarm 92. The microprocessor 82 multiplexes this alarm signal in the transmission. When the battery backup 88 loses its charge, noted by an indicator 93 the remote multiplexer 18 discontinues transmission and service is lost until power is returned. Also coupled to the power supply 90 is a plurality of suitable DC-DC converters 94 to provide the various DC voltage levels for the circuitry of the remote multiplexer 18.

The utility microprocessor 82 in addition to the functions described above, further communicates with the central office 14 over the signal and control/status channels. The supervisory signals associated with the voice and data channels are passed to and from central the office 14 on the signal channel. The microprocessor 82 interprets the encoded signals and delivers them to the correct microprocessor component. By design, the digitally encoded supervisory signals introduce no significant difference in timing or delays from the analog signaling they replace.

The remote multiplexer 18 is controlled from the central office 14 by the loop frame 24 and more particularly a loop cage supervisor (not shown). The loop cage supervisor sends commands to the utility microprocessor 82 on the control/status channel. These commands are interpreted by the microprocessor 82. In the other direction, the microprocessor 82 sends status information to the loop cage supervisor. The interaction between the loop cage supervisor and the remote multiplexer is further described in the above mentioned U.S. patent application Ser. No. 711,083.

The cable from each RJ-11 connector, connected to one of the phone sets 19 or 21 or to a modem (not shown) is attached to the remote multiplexer 18 by two screw down connectors illustrated in the terminal strip 70. The analog voice signals are applied to the voice modules 75 and 77. Each module contains a hybrid circuit 80a and 80b, respectively, where the subscriber transmitted and received signals are separated for processing. The analog voice signals are applied to an active filter within a codec/filter 78a and 78b, respectively, to restrict the effective output to the voice frequency range. The filtered analog voice signals are then converted to standard pulse code modulated (PCM) by the codec portion of the codec/filters 78. The PCM encoded voice channels are then converted to 32 kilobits per second CCITT ADPCM-DLQ by digital signal processors (DSP) 76a and 76b programmed to implement the conversion algorithm. The voice channels are then passed to the frame processor unit 74 where they are multiplexed with other channels supported by the remote multiplexer 18. The multiplexed information is transmitted to the central office 14 by the transceiver 72 along the subscriber loop 16. Preferably, 8 four bit voice samples are buffered by the frame processor 74 before being transmitted each millisecond during a "pong" burst.

Supervisory signals from the phone connection (off-hook) are picked up at the hybrid circuits 80a and 80b and passed to the microprocessor 82. The microprocessor 82 encodes the voice supervisory signals and multiplexes them with signaling for other channels, and passes the information to the frame processor 74 to be multiplexed with other information on the signal channel. Ring indication is passed in the opposite direction from the central office 14 to the subscriber equipment connected to the remote multiplexer 18 in the same manner.

Medium speed data is transported within the telephone system over full duplex, 8 kb/s synchronous channels. These channels can support 9600 baud asynchronous data rates because the framing bits (start and stop bits) that accompany each byte of asynchronous data are not transported through the channel. Medium speed data is restored to its original format before it is transmitted to the destination equipment.

When a customer requests a medium speed vendor services, the medium speed data path must be established between the remote multiplexer 18 and a medium speed vendor interface line. The medium speed data channel is established by the control management system (CMS) (not illustrated) of the telephone system. Data from the remote multiplexer 18 is transported to the loop frame 24 over the subscriber loop 16. The same physical path is used to transport data from the vendor via the central office 14 to the remote multiplexer 18.

Although modems are not necessary for medium speed data paths, modem signaling is used at each end of a medium speed data channel to allow an easy connection of existing vendor terminal and subscriber equipment. For example, the telephone system provides an RS-232-C data circuit terminating equipment (DCE) interface to both subscriber and vendor interface equipment. The RS-232-C signal interface uses a data set ready (DSR) and clear to send (CTS) signal at the subscriber interface and the vendor interface. The DSR and CTS signals are always asserted as long as there is power and the data path through the telephone system is functional. The data terminal ready (DTR) signal from the subscriber equipment is presented as a data carrier detect (DCD) signal to the vendor interface equipment. Similarly, the DTR signal from the vendor interface equipment is presented to the subscriber interface as a DCD signal. This allows the subscriber and vendor interface equipment to interact using conventional modem style signaling as if they were connected through a switched circuit. When the subscriber's terminal asserts DTR, the DCD signal at the vendor interface appears to the vendor as though a switch modem has just accepted a dialed connection. The RTS signal is not required by the telephone system and is hence ignored.

The data interface module 84 handles all data input/output in the remote multiplexer 18. The module 84 performs the additional function of encoding the asynchronous data into a bit stuffed synchronous format suitable for transmitting over the medium speed data channel of telephone system 10. When synchronous medium speed data is received by the remote multiplexer 18, the module 84 restores the data to its asynchronous format. In the medium speed synchronous protocol, the number of bits that must be transmitted is reduced. Preferably a fixed 8 kilobit channel is used to transmit and receive medium speed data at any data rate. When there is no medium speed data to transmit over the medium speed channel, a fixed stream of synchronization bits is transmitted.

The remote multiplexer 18 provides the physical access point via a shift level 101 to one of the RJ-41 connectors at the terminal strip 70 for customer equipment connected to the medium speed data channel. The remote multiplexer 18 transmits all medium speed data from the subscriber premise equipment to the loop frame 24 over the subscriber loop 16 and outputs all medium speed data from the loop frame 24 to the remote multiplexer 18. The remote multiplexer 18 is able to set asynchronous input/output characteristics such as baud rate. The input/output characteristics are set by a suitable control and management system (CMS) (not shown) located at the central office 14 when a medium speed channel is initially activated and when a customer requests that existing service be changed. The utility microprocessor 82 continually monitors the medium speed channel interface hardware for potential problems. Hardware errors cause an alarm message to be transmitted to the loop frame 24. If a problem is detected, the remote utility processor 82 may be configured to run diagnostic programs to define the nature and extent of the hardware problem. The remote multiplexer 18 may also be configured to loop back medium speed data from central office loop cards. Loop back testing is used throughout a telephone system to insure that data is being transmitted and received correctly.

The medium speed channel supports data rates of 300, 1200, 2400, 4800 or 9600 baud via the level shift 101. The asynchronous connections on both sides of a medium speed channel are configured with the same baud rate. The data rate for the subscribers data channel is set at subscription time. The transmission characteristics of the shift level 101 are configured when the medium speed channel is first established. Customers are able to change their medium speed channel input/output settings by means of the CMS via the utility processor 82.

A subscriber accesses medium-speed data services by connecting data termination equipment (DTE), such as a personal computer or asynchronous display terminal, to the remote multiplexer medium-speed data port. This port is preferably a standard 8-pin, non-keyed modular jack and conforms to the specifications described in the publication, *Bell System Technical Reference: Miniature Plugs and Jacks*, December 1982, PUB 47102. The medium-speed data port provides an asynchronous, full-duplex, RS-232-C (Type D) compatible, DCE (data communications equipment) interface that supports data rates up to 9600 baud. Table 3 lists this port's wire assignments; Table 4 describes port configuration.

TABLE 3

Medium-Speed Port Pin Assignments

| Pin | Signal | Description |
|---|---|---|
| 1 | RX | Receive Data |
| 2 | CTS | Clear to Send |
| 3 | DCD | Data Carrier Detect |
| 4 | SG | Signal Ground |
| 5 | DSR | Data Set Ready |
| 6 | DTR | Data Terminal Ready |
| 7 | RTS | Request to Send |
| 8 | TX | Transmit Data |

TABLE 4

Medium-Speed Port - Standard Configuration

| | |
|---|---|
| Port Type | DCE |
| RTS/CTS Strapping | Off |
| Baud Rate | Autobaud [2] |
| Stop Bits | 1 |
| Character Length | 8 bits |
| Parity | None |

Alternate port configurations are possible, and increase the variety of subscriber-premises equipment that can be connected. Options may include configuration as DTE, type of service (dedicated, contention-based), flow control signaling, and character-format options (parity, number of stop bits, character length, baud rate/autobaud).

The remote multiplexer 18 further supports four bidirectional constant transmission synchronous one kilobit per second data channels. These low speed data channels deliver services from the low speed data service vendors to the remote multiplexer 18 through the RJ-41 modular connectors connected to terminal strip 70 and the buffers 103a–103d. Examples of such low speed data services include utility meter reading, alarm and security service, energy management, credit card verification, point of sale terminals and videotex. To utilize such low speed data services in a telephone system, specialized equipment is required by the low speed data services vendor at each end of the low speed data channel. Subscriber premise equipment delivers the low speed data to the RJ-41 interfaced at the terminal strip 70. The vendor premise equipment actually provides the service. The low speed data channels of the telephone system allow the subscriber premise equipment and the vendor premise equipment to communicate with each other.

The remote multiplexer 18 accepts the low speed data signals from the subscriber premise equipment and multiplexes it with the voice and high speed data and transmits the multiplex stream to the central office 14. The low speed data is suitably sorted when it arrives at the central office and is delivered to the appropriate low speed data services vendor. An advantage of the low speed data channel is that such low speed data services are multiplexed with other services, voice and medium speed data, on the existing single subscriber loop 16. Hence, the cost to deliver such low speed services is greatly reduced. Secondly, the low speed data from a plurality of remote multiplexers 18 can be concentrated onto a single communications line to the low speed data services vendor, further reducing the cost of the service to the vendor.

In a preferred embodiment of the present invention, the remote multiplexer 18 provides an interface for four one kilobit per second synchronous data channels for the bidirectional transfer of data between the remote multiplexer 18 and the vendor premise equipment (not shown) connected to the central office 14. In the remote multiplexer 18, the microprocessor 82 manages the low speed data communications, configures the low speed ports, institutes diagnostics, and detects and reports alarm conditions. The four low speed data channels provided by the remote multiplexer 18 are full duplex synchronous data communication channels operating at speeds up to 1,000 bits per second. Each of the channels is fully independent of the other channels. Other data transfer rates include 10, 25, 50, 100, 250, and 500 bits per second. A clock signal appropriate to such transfer rate is presented from the utility microprocessor 82 to the subscriber premise equipment.

The bandwidth allocated to each low speed data channel is fixed at 1,000 bits per second. The microprocessor 82 in the remote multiplexer 18 is responsible for rate conversion whenever one of the low speed RJ-41 low speed ports have been configured for a speed lower than 1,000 bits per second.

Only two aspects of each low speed data port can be configured, these being channel activation and signaling rate. A channel can be activated or deactivated. Only an activated channel allows data to be transmitted over the subscriber loop 16. Each channel can be independently activated or configured for speed.

Configuration of the low speed data ports is carried out by the microprocessor 82 in the remote multiplexer 18 under control of a suitable loop frame supervisor in the central office 14. The loop frame supervisor may be designed to issue low speed data channel configuration commands over the control and status channel provided in the telephone system. No low speed data information is carried on such signal channel.

The microprocessor 82 in the remote multiplexer 18 executes low speed data channel diagnostics under the request of the supervisor in the loop frame 24. Diagnostic request and responses are delivered over the control status channel. The supervisor in the loop frame 24 can request loop back diagnostics of the remote multiplexer 18 low speed data channels. Such diagnostics indicate error conditions in the channel path. Each low speed data channel has one loop back point in the remote multiplexer 18 located at the microprocessor 82. Data from subscriber premise equipment can be looped back at the remote multiplexer 18. Data from the central office 14 can also be looped back to the central office 14. Test data can be injected or tested at the loop back point, permitting bit error rate statistics to be generated.

The buffers 103a-103d are coupled in each low speed data channel between the microprocessor 82 and the terminal strips 70 at each RJ-41 interface. Since each low speed data port can support a single channel, the subscriber may use up to four low-speed services simultaneously; for example, burglar detection, meter-reading, fire detection, and medical-alert services.

The low-speed data ports are standard 8-pin, non-keyed modular jacks (see FIG. 3 in the "Medium-Speed Data Interface" section) and conform to the specifications described in the publication, *Bell System Technical Reference: Miniature Plugs and Jacks,* December, 1982, PUB 47102. Each low-speed data port provides an asynchronous, full-duplex, RS-232-C (Type D) compatible, DCE (data communications equipment) interface that supports data rates up to 1200 baud. Table 5 lists this port's wire assignments; Table 6 describes port configuration.

TABLE 5

| Low-Speed Port Pin Assignments | | |
|---|---|---|
| Pin | Signal | Description |
| 1 | RX | Receive Data |
| 2 | CTS | Clear to Send |
| 3 | DCD | Data Carrier Detect |
| 4 | SG | Signal Ground |
| 5 | DSR | Data Set Ready |
| 6 | DTR | Data Terminal Ready |
| 7 | RTS | Request to Send |
| 8 | TX | Transmit Data |

TABLE 6

| Low-Speed Port - Standard Configuration | |
|---|---|
| Port Type | DCE |
| RTS/CTS Strapping | Off |
| Baud Rate (bit/s) | 1200 |
| Stop Bits | 1 |
| Character Length | 8 bits |
| Parity | None |

Alternate port configurations are possible, and increase the variety of subscriber-premises equipment that can be connected. Options include configuration as DTE, flow control signaling, and character-format options (parity, number of stop bits, character length, baud rate).

It may be seen, therefore, that the invention provides a remote multiplexer unit for use in a telephone system wherein fully digitized integrated voice and data are transmitted and received on a subscriber loop. The multiplexer unit assembles and disassembles digitied voice and data information in a loopback control. The remote multiplexer may be easily controlled from the central office and acts as an interface to provide a customer with a plurality of service options over a single subscriber loop.

Various modifications of the invention in addition to those shown and described herein will become apparent to those skilled in the art from the foregoing description and accompanying drawings. Such modifications are intended to fall within the appended claims.

What is claimed is:

1. A multiplexer unit for installation at or near a telephone system subscriber premise for interfacing between equipment located at the subscriber premise and a central office, said multiplexer unit comprising, voice interfacing means for converting between voice encoded digital signals and analog signals for operatively connecting to at least one subscriber analog voice communication equipment, data interfacing means for routing data encoded digital signals to at least one subscriber data communication equipment, frame processing means connected to each of said voice interfacing means and said data interfacing means for assembling and disassembling digital frames each comprised of voice encoded digital signals, data encoded digital signals, and control and status encoded digital signals, transceiver means connected to said frame processing means for transmitting to and receiving from a central office via a single subscriber loop serial full duplex frames of voice encoded, data encoded, and control and status encoded digital signals, and utility processing means connected to said voice interfacing means, said data interfacing means, said frame processing means, and said transceiver means for controlling same in accordance with said control and status encoded digital signals received by said transceiver from the central office, and for producing control and status encoded digital signals for transmission by said transceiver to the central office.

2. A multiplexer unit according to claim 1 wherein said utility processing means includes clock means for controlling the time of transmission of each frame of digital signals transmitted by said transceiver means.

3. A multiplexer unit according to claim 1 wherein said voice interfacing means comprises a pair of voice modules, each of said voice modules containing a hybrid circuit for separating transmitted and received voice encoded digital signals, each of said voice modules further including filter means for restricting signals to the voice frequency range.

4. A multiplexer unit according to claim 1 wherein said data interfacing means include at least one medium-speed data port and means for routing medium-speed data encoded digital signals to said medium-speed data port.

5. A multiplexer unit according to claim 4 wherein said data interfacing means include a plurality of low-speed data ports and means for separating and routing respective low speed data encoded digital signals to respective ones of said low-speed data ports.

6. A multiplexer unit according to claim 1 including first power supply means for connection to a local source of power at the subscriber premise, and second power supply means including storage battery means for operating said multiplexer unit in the event of failure of the local source of power.

7. A multiplexer unit according to claim 1 wherein said utility processing means include means for loop back testing of at least one of the components of said multiplexer unit.

* * * * *